US005197042A

United States Patent [19]

Brookner et al.

[11] Patent Number: 5,197,042

[45] Date of Patent: Mar. 23, 1993

[54] POSTAGE METER HAVING AUTO DATING DEVICE

[75] Inventors: George M. Brookner, Norwalk; Jacqueline Collins, Bridgeport; Terrence M. Doeberl, West Redding, all of Conn.

[73] Assignee: Pitney Bowes Inc., Stamford, Conn.

[21] Appl. No.: 786,317

[22] Filed: Oct. 31, 1991

[51] Int. Cl.[5] ....................... G04B 47/00; G04B 19/24; G06F 15/20

[52] U.S. Cl. ........................................ 368/10; 368/28; 235/375; 346/80; 364/400

[58] Field of Search ............................ 368/10, 28, 29; 235/375, 377, 380, 381, 449, 492; 346/20, 80, 81; 364/400, 406, 464, 466, 569

[56] References Cited

U.S. PATENT DOCUMENTS 3,869,986 3/1975 Hubbard .............................. 101/91
4,060,720 11/1977 Check, Jr. ........................... 235/307
4,520,725 6/1985 Haug .................................... 101/91
4,649,849 3/1987 McCormick ........................ 114/222
4,900,904 2/1990 Wright et al. ...................... 235/381
4,933,849 6/1990 Connell et al. ..................... 364/400

*Primary Examiner*—Vit W. Miska
*Attorney, Agent, or Firm*—Charles G. Parks, Jr.; Melvin J. Scolnick

[57] ABSTRACT

The improved postage metering combination includes a date setting mechanism for enabling the printing of a posting date by a printing assembly. The combination includes a calendar clock in communication with a microcomputer for providing current date information to the microcomputer. A date printing mechanism is connected to the microcomputer date information to be printing by the combination or causing said date printing to be ducked. Data entry keys are provided to communicate with the microcomputer the current date information is printed by the combination, date information is ducked or the date to be printed is incremented in advance of the current date.

6 Claims, 4 Drawing Sheets

POSTAGE METER HAVING AUTO DATING DEVICE

BACKGROUND OF THE INVENTION

The invention relates to postage meters, and more particularly, to electronic postage meters having an auto dating capability.

Postage meters having an auto dating function are known and are described, for example in U.S. Pat. No. 4,060,720 entitled DATE PRINTING DEVICE WITH ELECTRONIC CALENDAR CLOCK, issued to Check, Jr. and assigned to the assignee of the present invention. The postage meter in accordance with this reference includes an electronic calendar clock which generates and stores signals representing different days and months of the year. The electronic calendar clock provides one input to a comparison circuit. Another input to the comparison circuit is provided by an encoder which generates signals representing the current setting of a date printing device. The comparison circuit samples inputs from the calendar clock and the encoder and generates a control signal when a mismatched is detected.

U.S. Pat. No. 4,649,849, issued to Benzin, describes a method of inserting a date in the postage meter using the postage meter keyboard to input a numerical date for setting the date printwheels. In addition, this reference and U.S. Pat. No. 4,520,725 further suggest the use of a calendar clock for input to the dater mechanism.

U.S. Pat. No. 3,869,986 to Hubbard suggests that date data may be applied through use of the keyboard.

In each of the prior art devices, particularly those using a calendar clock, there is no suggestion of dealing with a user's problem of dating the mail for posting on the proper date when that date is later than the current date. That is, since the Post Office requires that mail be posted on the date that is imprinted on the mailpiece, there is a problem for mailers who plan for mailings to be posted some time in the future or those who are preparing a batch which will require posting the next date. In either event, the automatic dating changes using a calendar clock alone will not allow the use to prepare such mailings.

With the other known method of setting the date through the keyboard, it is clearly inconvenient to have to type in a new date to advance and then type another date to cause the return to the proper date when the postage meter has a supposedly automatic calendar dating feature.

SUMMARY OF THE INVENTION

In accordance with the invention, a calendar clock module is incorporated in the postage meter to enable automatic setting of the date to the current date. There is also provided at least one button for the automatic advancing of the date to a desired date. The operation of the button causes the date setting to be advanced one day at a time until a desired advance date is selected, although the date advance increment may be set to an increment other than one day. For example, it may be desirable to set the increment to three days to correspond to mail processed on a Friday but not mailed until the following Monday. The increment for which a date will be advanced may be selectable only by a mail room supervisor to prevent operator error. A "today" button, or alternatively a reverse button, causes the date to return to the current date. Additionally, an "Date ON/OFF" button can be provided to permit ducking (omitting) selectable portions of, or the entire date by the meter for particular postal classes or other uses. It will be appreciated that separate buttons may be provided to cause a reverse as well as an advance and that other switches may be provided for selecting the day, month, or year to be advanced or ducked (omitted). Alternatively, fast and slow rate switches may be provided.

In a further embodiment, the date setting device is prevented from setting an earlier date than the current date or any selected date in advance of the current date of the calendar module.

It is therefore, a first object of the invention to provide a postage meter having an auto dating device which provides ease of advancement of the date setting whenever desirable.

It is a further object of the invention to provide a postage meter date setting mechanism which prevents the operator from back dating the date printed by the postage meter.

DETAILED DESCRIPTION OF THE PREFERRED EMBODIMENT

Figure 1:
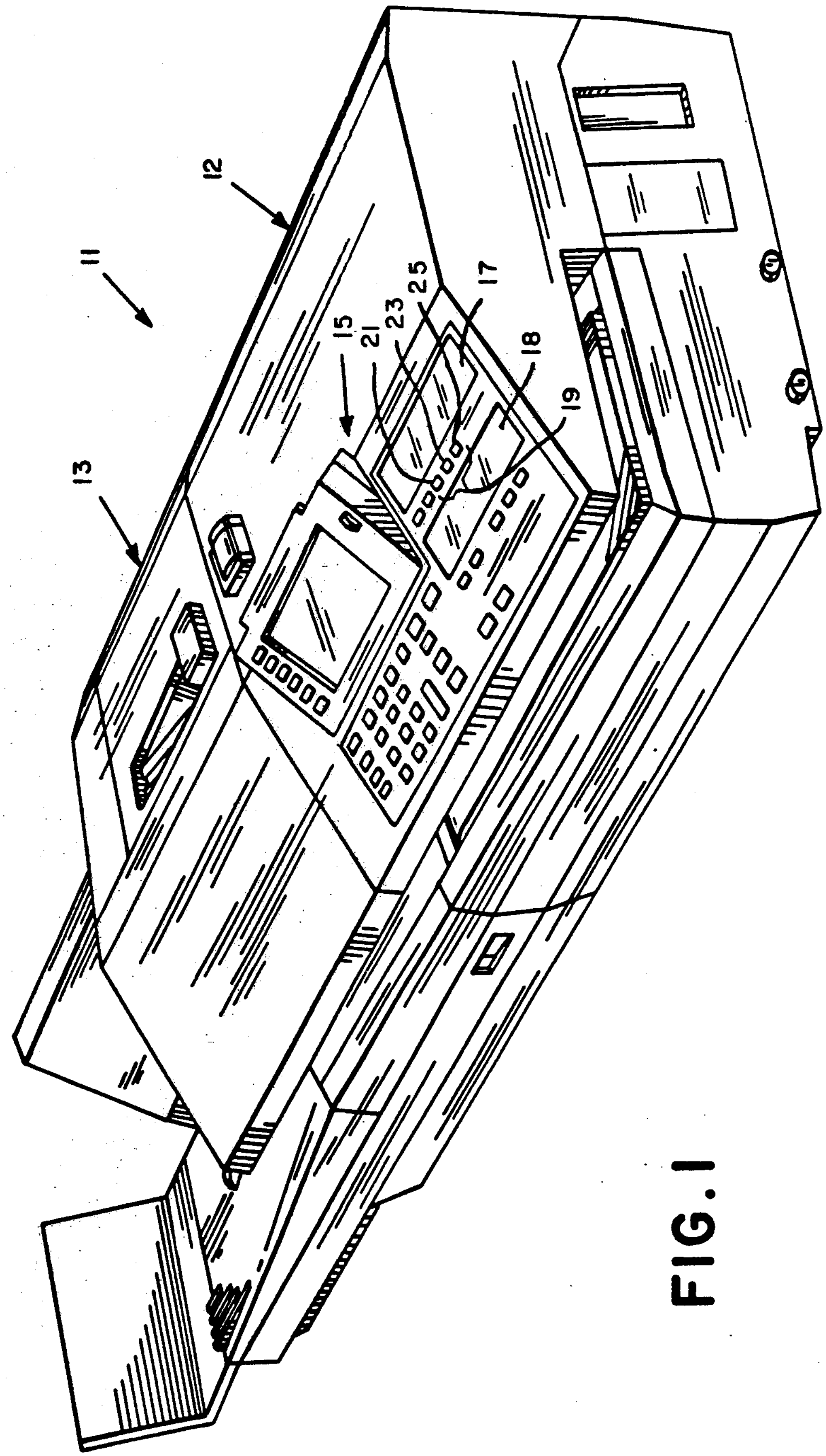
FIG. 1 is a perspective view of a postage meter mailing machine incorporating a date setting device in accordance with the present invention.

Referring to FIG. 1, in the most preferred embodiment of the present invention, a mail processing system, generally indicated as 11, includes a mailing machine module 12 in combination with a feeder module 13. The mailing machine module 12 includes a main display and keyboard entry system, generally indicated as 15. As part of the main display and keyboard entry system is a mimic display 17 which represents a visual replication of a printed postage indicia and slogans. A plurality of functions keys 19 (more clearly shown in 3A) includes a key 21 having printed thereon "Today", key 23 having printed thereon "Date ON/OFF", and a key 25 having printed thereon "Date Advance".

Figure 2:
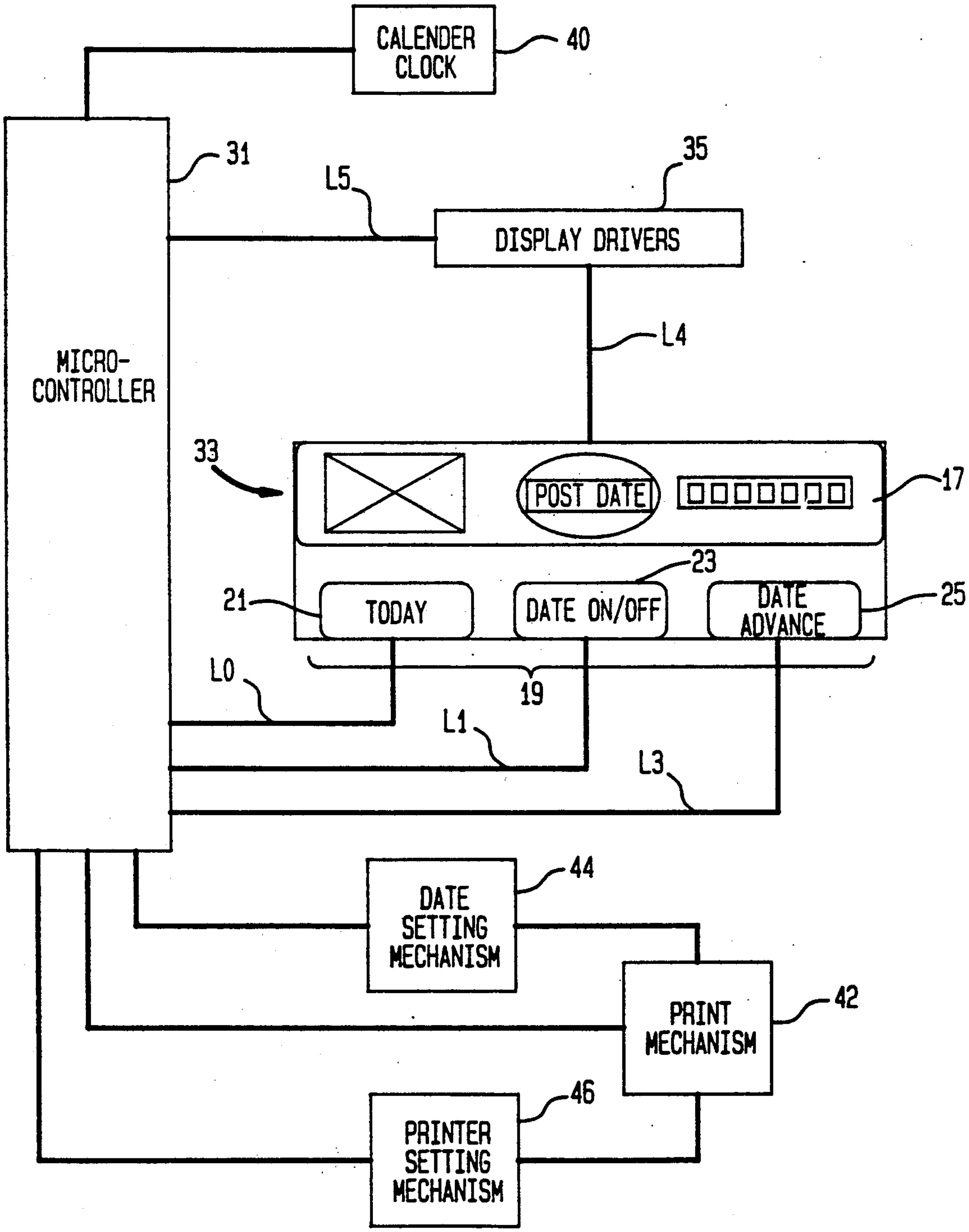
FIG. 2 is a diagrammatic representation of a microcontrolled in combination with a date setting device in accordance with the present invention.

Referring to FIG. 2, a microcontroller 31 is housed within the mailing machine 12 and is in line communication with a dater interface system, generally indicated as 33. For the purposes of this invention, the dater interface system includes the mimic display 17 and date function keys 12, 23 and 25. The function key 21 communicates to the microcontroller 31 over line L0. The function key 23 communicates to the microprocessor 31 over line L1 and the function key 25 communicates with the microcontroller 31 over line L3. The mimic 17 communicates with a display driver 35 over line L4. In turn, the display driver is in communication with the microcontroller over line L5.

A calendar clock 40 is in communication with the microcontroller 31 for informing the microcontroller 31 of the current date. The mailing machine 12 also includes a printing mechanism 42. In the preferred embodiment of the present invention, a meter is employed which is a flat-bed type having meter print elements which are settable by setting mechanisms 44 and 46. The meter is generally comprised of a cartridge which is insertable into the mailing machine 12 upon repositioning of a top cover. The mailing machine includes a platen for causing contract between a mailing machine positioned envelope and the printing mechanism of the postage meter, here generally indicated as 42, of the mailing machine. The system here described is particularly set forth in U.S. Pat. No. 4,876,956, herein incorporated by references and represents the preferred embodiment. It should be readily apparent that the present invention is equally suited for other processing configurations.

A date setting mechanism 44 which is in communication with the microcontroller 31 communicates with the print mechanism 42 for causing print mechanism 42 to print a selected date. Further, a print setting mechanism 46 is in communication with the print mechanism 42 and the microcontroller 31 for causing the printing mechanism 42 to print an appropriate postage amount.

Figure 3A:
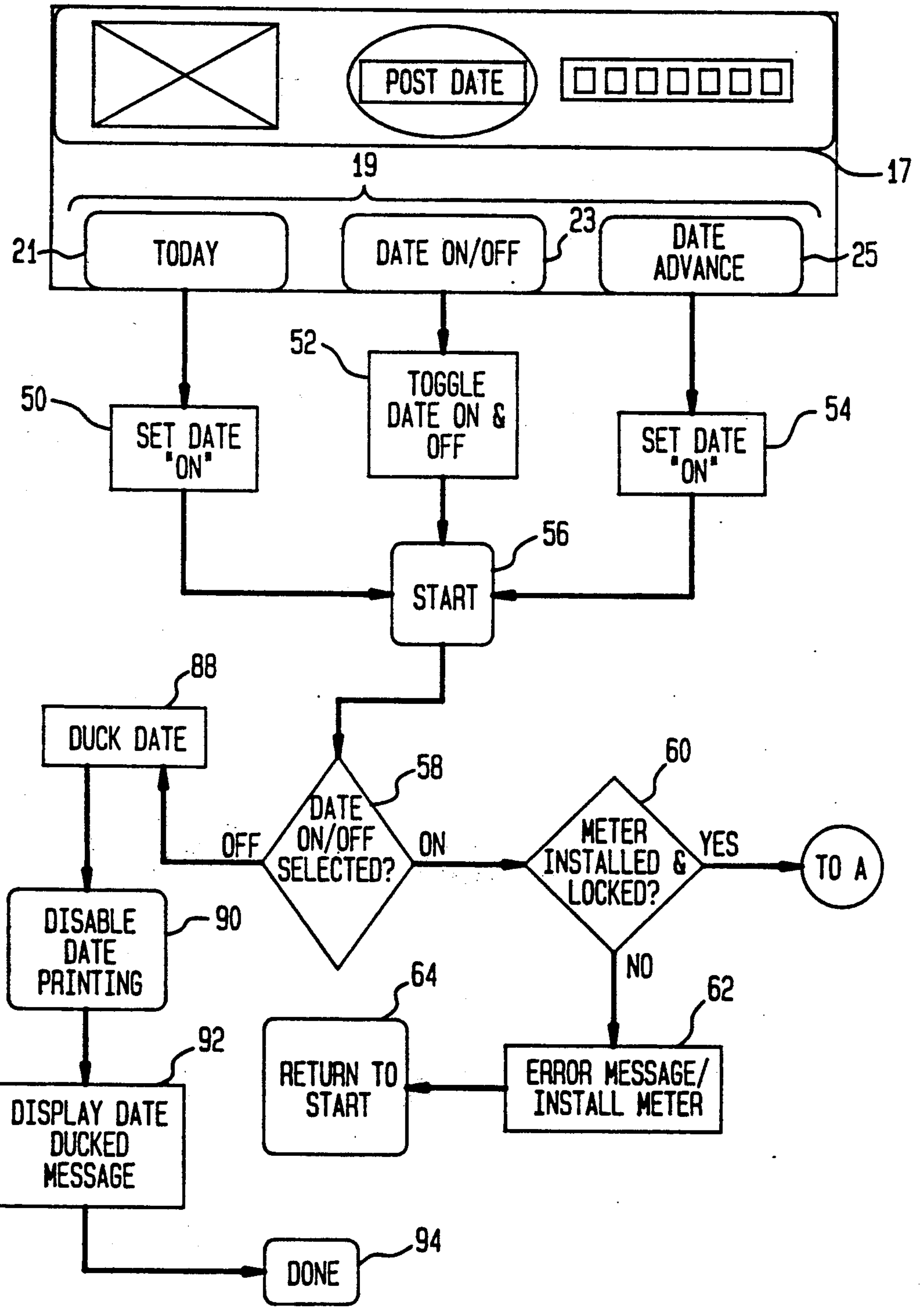
FIGS. 3A and 3B are diagrammatic and logic flow representation of date selection and microcomputer response logic for such selections in accordance with the present invention.
Figure 3B:
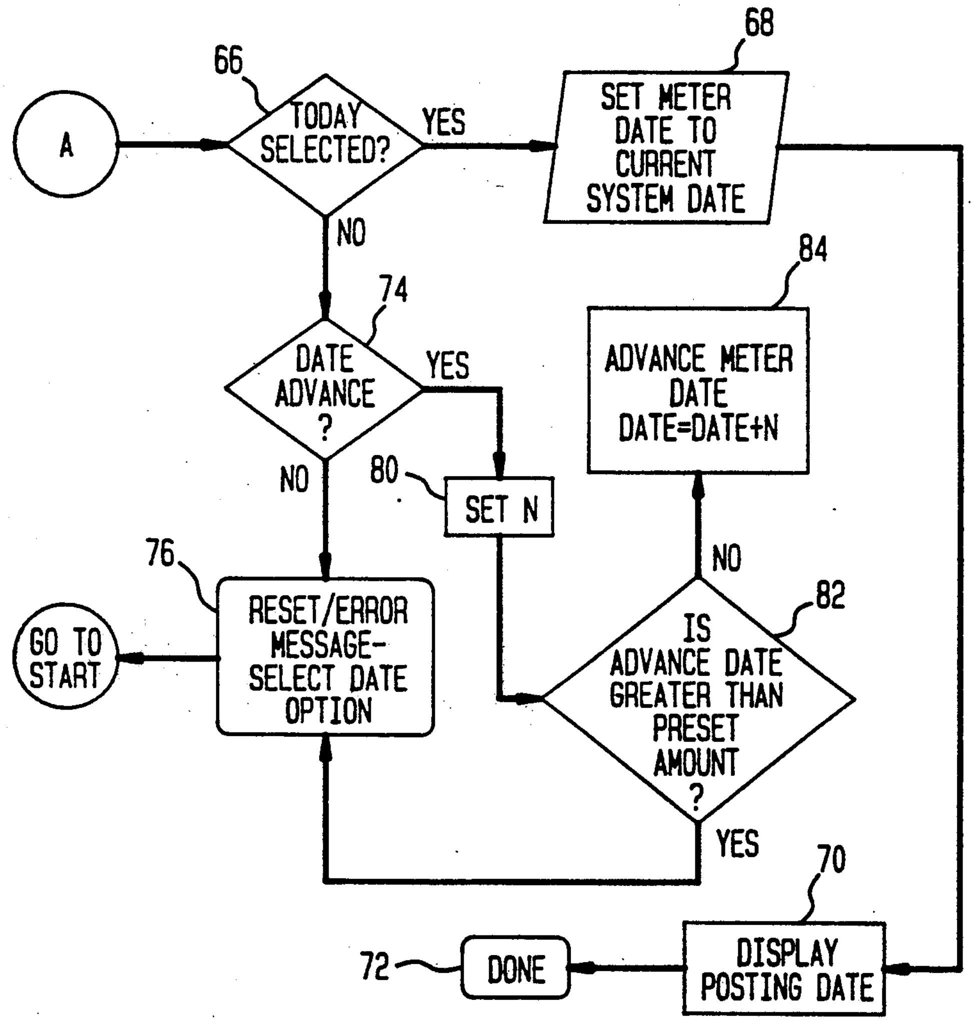

Referring to FIGS. 3A and 3B, the date setting mechanism operates in one of three selectable modes represented respectively by the function key 21 for posting of mail with the current date, ducking of the date represented by function 23 which toggles the date function On and Off, and the date advance function represented by key 25. If an operator wishes to process mail and post the current date, the operator depresses the function key 21. The microcontroller 31 is programmed to then set the date function "ON" at logic block 50. The microprocessor enters a routine at 56 wherefrom a test is performed at logic block 58 to see if the date function is set "ON" or "OFF". In this mode, the date function has been set "ON" and the microcontroller than proceeds to check, at logic block 60, to see if a meter has been installed in the mailing machine and locked in position. If a meter has not been installed in the mailing machine, a error message is caused to display on the mimic display 17, at logic block 60, instructing the operator that the meter needs to be installed and the routine then proceeds to stand ready to receive information at logic block 64.

It at 60, it is determined that the meter has been installed and is properly in position, the routine then proceeds to check to see whether today's date has been selected at logic block 66. If today's date has been selected, then the routine proceeds to logic block 68 and therefrom the microcontroller instructs on the date setting mechanism 44 to cause the printing mechanism 42 to print the current date represented by the calendar clock 40. The routine then proceeds to cause the posting date to be displayed on the indicia mimic 70 at logic block 70. After the posting date has been displayed, the routine proceeds to logic block 72 indicating that the posting function is "DONE".

If the operator wishes to duck the printing of a postage date, which is often the cause where mail postage is accounted by other means, the operator presses the date "ON/OFF" button 23. The date function is then toggled "ON" and "OFF" in response to operator depression of the function key 23 at 52. From logic block 52, the routine enters the start routine at logic block 56 from which the routine proceeds to logic block 58. If at logic block 58 the date is determined to be set "OFF", the routine proceeds to logic block 88. At logic block 58, the date duck function is ascertained causing the microcontroller 31 to set the date setting mechanism appropriately, for example, set all date elements to zero. From logic block 88, the routine proceeds to logic block 90 where at the dater mechanism is disabled or otherwise caused to set the date mechanism to represent a date ducked condition. At logic block 92, the mimic display is caused to display a message indicating that the date ducked function has been chosen, wherefrom the routine proceeds to logic block 94 indicating a finished state.

If an operator wishes to set a date for posting mail in advance of the present date, the operator then depresses function key 25 causing the date setting function to be set "ON" at 54. The routine enters at logic block 56 and therefrom the routine proceeds to the decision point 58 to determine the date function has been selected The routine then proceeds to logic block 609 to check if the meter has been properly installed and locked into position. If the meter function has not been properly installed at logic block 60, the routine proceeds to logic block 62 and 64 as before described. If at logic block 60, the meter has been properly installed, the routine proceeds to logic decision block 66 to determine whether today's date has been selected. In this instance, the "today" date was not selected, therefore, the routine proceeds to logic decision block 74 to determine if the date advance function had been selected. If the date advance function has not been selected, the routine proceeds to logic block 76 where a reset/error is determined and a message is caused to be displayed indicating such an error in the selection of date option and the routine returns to start at logic block 56 to await operator instruction. There is a variable called "N" which is defined as the number of days requested to advance the date. An example of this is if the date is set to Monday and the operator wants to advance the date to Wednesday, then N=2. N is determined by the number of times the "date advance" key is pressed. There is also a variable called the "preset amount" which is defined as a maximum number of days that the date can be advanced; "N" cannot be greater than "preset amount". This variable could be set by a supervisor. This preset amount prevents operators from inadvertently setting the date too far ahead. An example would be if the preset amount was set to 7 then no envelope could be dated more than a week in advance. If at 74, the routine determines that a valid date advance has been selected, it proceeds to logic block 80 to set the variable "N". The routine then proceeds to decision block 82 to determine if the advanced date is greater than a preset amount. If at logic block 82 it is determined that the advance date is greater than the preset amount, the routine returns to logic block 76 and indicates an error message on the display and proceeds as afore-described. If at logic block 82, the date advance is less than or equal to the preset amount, the routine proceeds to logic block 84 whereupon the meter date setting mechanism is caused to set the printer mechanism to indicate a date equal to the "today" date plus in increment "N". From logic block 84, the routine proceeds to logic block 70, as afore-described, causing the display to indicate the posting date and thereafter goes to logic block 72 indicating a completed routine.

It is now readily appreciated that alternatively the date advance increment may be equated to the number of operator depressions of key 25.

What is claimed is:

1. An improved postage metering combination having a date setting means and printing means for printing postage or other information on an envelope and having a calendar clock module, a microcomputer connected to receive current date information from said calendar clock module, and a date printing means having a date printing mechanism for selectively printing posting date information in response to said date setting means or ducking the printing of date information on said envelope, said date printing means being connected to said microcomputer for receiving information advancing the date to be printed or causing said date printing means to duck printing of said date information wherein said improvement comprises:

date entry means for having a first, second and third date entry mode, said microcomputer being connected to said data entry means and being programmed to respond to said first mode to cause said microcomputer to inform said date setting means to set said date printing means to print the current date information, said second mode to cause said date printing means to duck printing of said current date information, and said third mode to cause said date printing means to incrementally advance in selectable increments.

2. An improved postage metering combination as claimed in claim 1, wherein said improvement further comprises means for preventing said date printing mechanism from printing a date earlier than the current date on said calendar module.

3. An improved postage metering combination as claimed in claim 1 or 2, wherein said improvement further comprises means for preventing said date printing mechanism from printing a date more than a preset amount in advance of the current date on said calendar module.

4. An improved postage metering combination having a date setting means and printing means for printing postage or other information on an envelope and having a calendar clock module, a microcomputer connected to receive current date information from said calendar clock module, and a date printing means having a date printing mechanism for selectively printing posting date information in response to said date setting means or ducking the printing of date information on said envelope, said date printing means being connected to said microcomputer for receiving information advancing the date to be printed or causing said date printing means to duck printing of said date information wherein said improvement comprises:

data entry means for having a first, second and third data entry mode, said microcomputer being connected to said data entry means and being programmed to respond to said first mode to cause said microcomputer to inform said date setting means to set said date printing means to print the current date information, said second mode to cause said date printing means to duck printing of said current date information, and said third mode to cause said date printing means to incrementally advance in selectable increments said posting date, displays means for displaying said posting date.

5. An improved postage metering combination as claimed in claim 4, wherein said improvement further comprises means for preventing said date printing mechanism from printing a date earlier than the current date on said calendar module.

6. An improved postage metering combination as claimed in claim 4 or 5, wherein said improvement further comprises means for preventing said date printing mechanism from printing a date more than a preset amount in advance of the current date on said calendar module.

* * * * *